United States Patent
Taniguchi et al.

(10) Patent No.: US 6,703,601 B2
(45) Date of Patent: *Mar. 9, 2004

(54) MOTION DETECTION OF AN OPTICAL ENCODER BY CONVERGING EMITTED LIGHT BEAMS

(75) Inventors: Mitsuyuki Taniguchi, Gotenba (JP); Masato Aochi, Gotenba (JP)

(73) Assignee: Fanuc, Ltd., Yamanashi (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 112 days.

(21) Appl. No.: 09/171,564
(22) PCT Filed: Feb. 23, 1998
(86) PCT No.: PCT/JP98/00726
§ 371 (c)(1),
(2), (4) Date: Oct. 21, 1998
(87) PCT Pub. No.: WO98/37383
PCT Pub. Date: Aug. 27, 1998

(65) Prior Publication Data
US 2002/0020809 A1 Feb. 21, 2002

(30) Foreign Application Priority Data
Feb. 21, 1997 (JP) .............................................. 9-052498

(51) Int. Cl.[7] .................................................. G01D 5/34
(52) U.S. Cl. ............................. 250/231.13; 250/237 G; 250/216; 250/231.16
(58) Field of Search ........................ 250/231.13–231.18, 250/237 R, 237 G, 570, 208.1, 208.2, 216; 356/373–375; 33/707; 341/11, 13, 31; 359/210, 234

(56) References Cited

U.S. PATENT DOCUMENTS

| 3,770,970 A | | 11/1973 | Trump ......................... 250/219 |
| 3,881,810 A | * | 5/1975 | Colao .......................... 359/619 |
| 4,536,650 A | * | 8/1985 | Carena et al. ........... 250/234.14 |
| 4,820,918 A | * | 4/1989 | Igaki et al. ............. 250/231.13 |
| 5,153,437 A | * | 10/1992 | Nishii et al. ........... 250/231.14 |
| 5,696,371 A | * | 12/1997 | Meyers .................... 250/208.1 |

FOREIGN PATENT DOCUMENTS

| JP | 59-63517 | 4/1984 | |
| JP | 61-246621 | 11/1986 | |
| JP | 62298704 A | 12/1987 | ........... G01B/11/00 |
| JP | 63-78021 | 4/1988 | |
| JP | 63078021 A | 4/1988 | ............ G01D/5/36 |

(List continued on next page.)

*Primary Examiner*—Que T. Le
*Assistant Examiner*—Thanh X. Luu
(74) *Attorney, Agent, or Firm*—Staas & Halsey LLP

(57) ABSTRACT

An optical encoder with a high utilization efficiency of light and easy to manufacture. The optical encoder comprises a conversion device formed in such a manner that lens elements are arranged periodically with a reference pitch IP for converting a beam L emitted from a light source into a plurality of shifting beams MF. The beam L is contracted to a half of the reference pitch IP by the conversion device and goes out as a parallel beam, to impinge on a light receiving section. On a board of the light receiving section there are arranged light receiving elements with a pitch of IP/2. When an object connected to the conversion device is rotated or translated, the position of each lens element changes synchronously and the shifting beam MF scans an arrangement of the light receiving elements. As a result, a ratio of a light amount reaching the light receiving element changes periodically. The resultant electrical signal is processed by a well-known processing circuit.

7 Claims, 8 Drawing Sheets

FOREIGN PATENT DOCUMENTS

| JP | 02071118 A | 3/1990 | ............ G01D/5/36 |
| JP | 3-80325 | 8/1991 | |
| JP | 5-332790 | 12/1993 | |
| JP | 06042981 A | 2/1994 | ............ G01D/5/38 |
| JP | 8-201114 | 8/1996 | |
| JP | 08201114 A | 8/1996 | ............ G01D/5/34 |
| JP | 8-233608 | 9/1996 | |
| JP | 08233608 A | 9/1996 | ............ G01D/5/30 |

* cited by examiner

FIG. 3
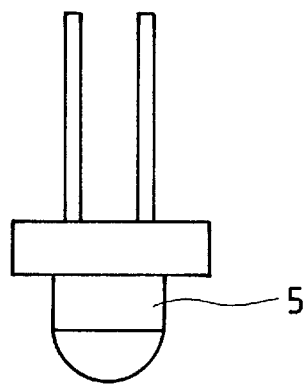
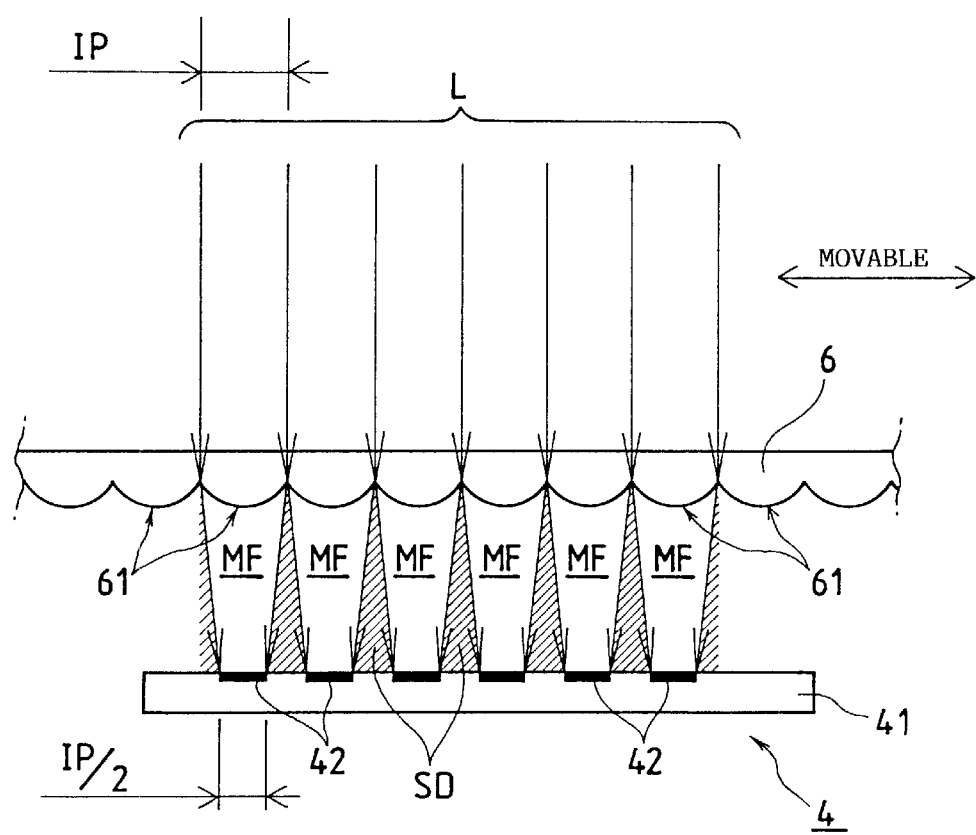

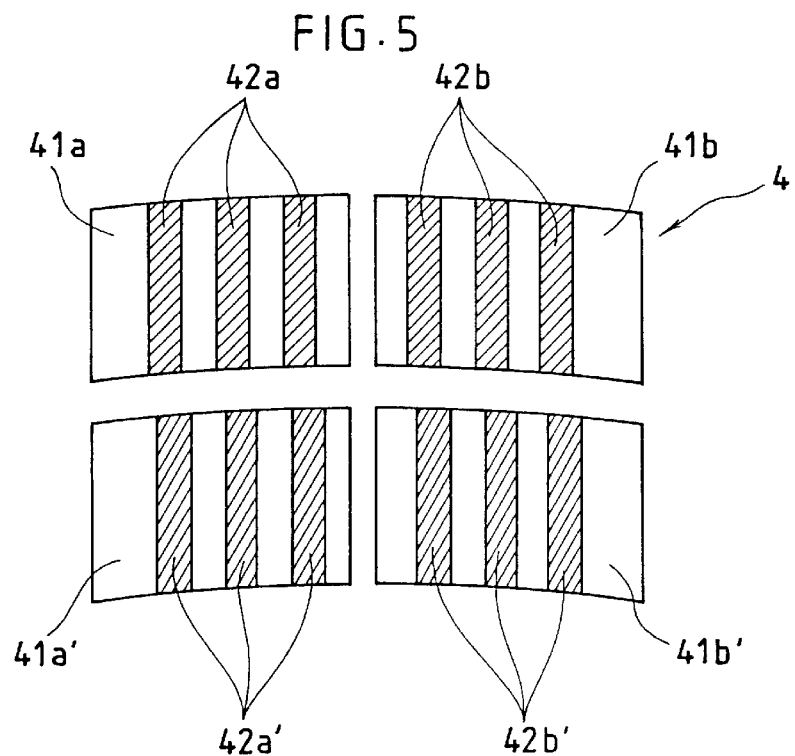
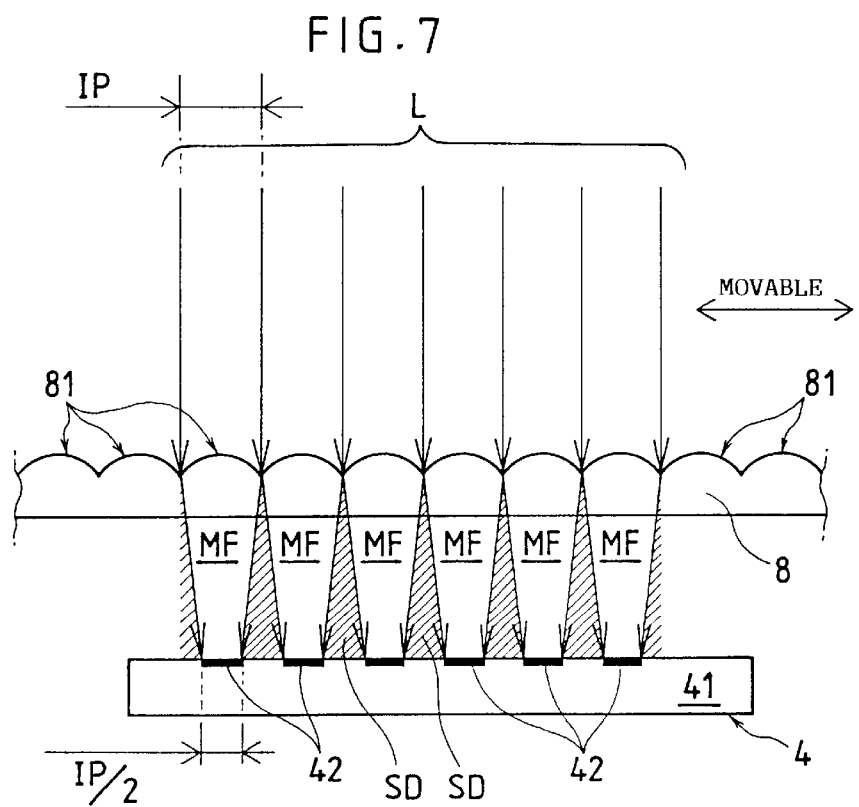

FIG. 6
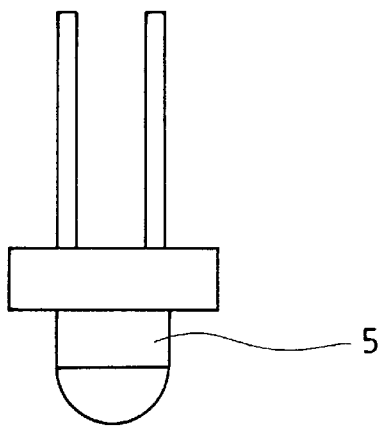
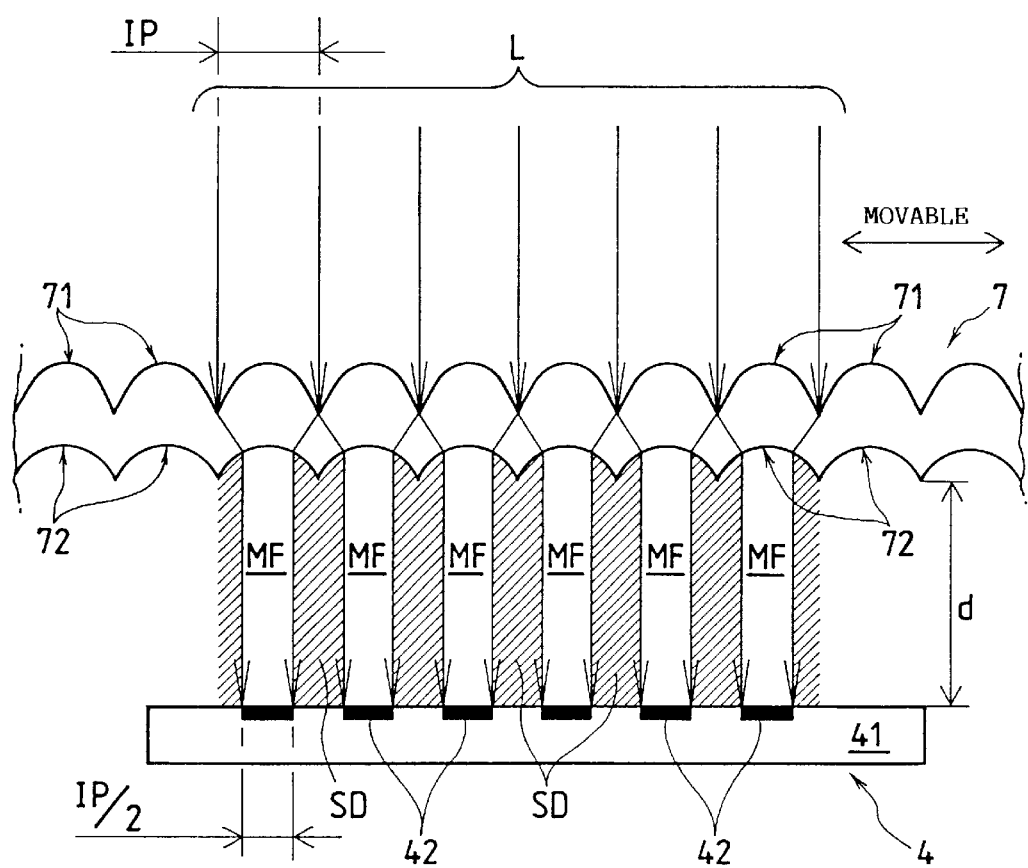

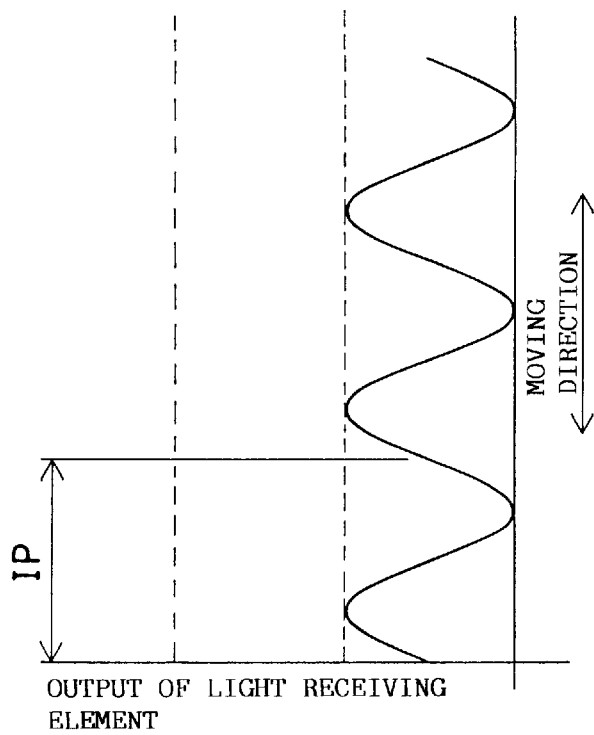
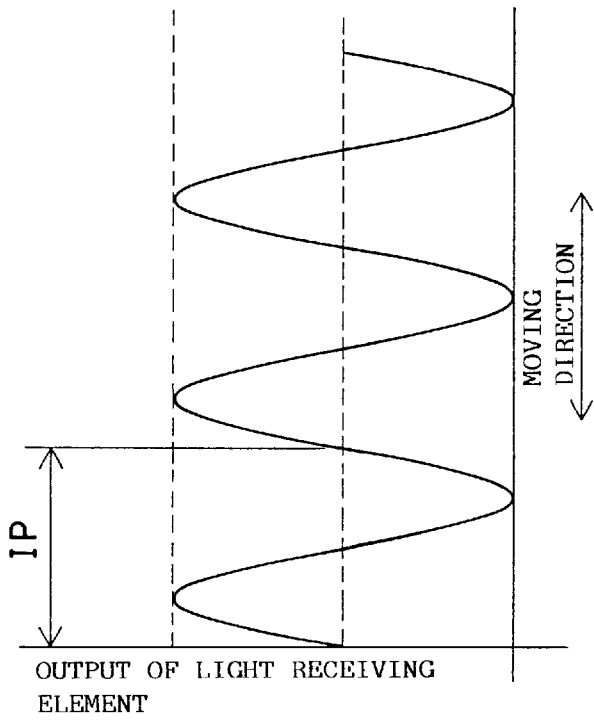

MOTION DETECTION OF AN OPTICAL ENCODER BY CONVERGING EMITTED LIGHT BEAMS

BACKGROUND OF THE INVENTION

Field of the Invention

The present invention relates to an optical encoder, and more particularly to an improvement in a structure of an optical detecting section of an optical encoder. The present invention is applicable to optical encoders of both types of a rotary type and a linear-type.

DESCRIPTION OF THE RELATED ART

Optical encoders are widely used in detecting position and/or speed of an object performing rotational or translation motion. FIG. 1 schematically shows a general structure of an optical detecting section of a rotary-type optical encoder for detecting rotational position and/or rotational speed of a motor, by way of example.

The optical detecting section comprises a movable slit (a rotary slit in this example, a linear motion slit for a linear encoder) 1, a rotating shaft 2, a stationary slit 3, a light receiving section 4 and a light source 5, as basic elements. The light source 5 incorporates a lens or the like for making a beam parallel if necessary as well as one or more light emitting devices (for example, LEDs). Part of a beam L emitted from the light source 5 is detected by the light receiving section 4 after passing through light transmitting portions of the movable slit 1 and the stationary slit 3 in succession, and almost all of the remaining beam is obstructed by a light intercepting portion of the movable slit 1 or the stationary slit 3.

FIG. 2 generally shows a sectional structure of the movable slit 1, the stationary slit 3 and the light receiving section 4 used in the conventional optical encoder as shown in FIG. 1. As shown in FIG. 2, the movable slit 1 is a device having a function of converting the beam L emitted from the light source 5 into a plurality of beams (hereinafter referred to "shifting beam group") which are periodically distributed and shifting in accordance with a motion of an object (e.g., a rotor shaft of a motor). The movable slit 1 comprises light intercepting portions 12 and light transmitting portions 13 formed periodically on surface (one surface or both surfaces) of a transparent board 11 with a pitch of a half of a predetermined reference pitch IP.

An optical material such as a glass plate is used as the transparent board 11. The light intercepting portions 12 and the light transmitting portions 13 are formed by depositing chromium on the whole surface of the transparent board 11 and then selectively removing the deposited layer of chromium by etching. The portions at which the chromium-deposited layer is removed by the etching is formed to be the light transmitting portions 13, and the remaining portions is formed to be the light intercepting portions 12.

The structure and manufacturing of the stationary slit 3 are the same as those of the movable slit 1. Specifically, light intercepting portions 32 and light transmitting portions 33 are formed periodically on surface (one surface or both surfaces) of a transparent board 31 with a pitch of a half of the reference pitch IP which is identical with that in the movable slit 1. An optical material such as a glass plate is used as the transparent board 11, and on the surface thereof the light intercepting portions 32 are formed by using a chromium deposition layer. As in the case of the movable slit 1, the selective removing of the chromium-deposition layer by etching can be used in order to form a board regions corresponding to the light transmitting portions 33. Alternatively, the light transmitting portions 33 may be formed by machining, e.g., punching of the board 31 made of a light intercepting material.

The light receiving section 4 has light receiving elements (e.g., photodiodes) arranged on a board 41 with a pitch of a half of the reference pitch IP. When the rotating shaft 2 connected to a rotor of a motor or the like is rotated, the movable slit is rotated, so that the rotational position of the light transmitting portion 13 formed on the movable slit 1 changes. Accordingly, the scannable beam are scanned and an overlapping relationship with the light transmitting portion 33 formed on the stationary slit 3 changes periodically.

The light incident on the light receiving element (light sensing zone) 42 is converted into an electrical signal, while the light incident on a region (light non-sensing zone) where the light receiving element (light sensing zone) 42 is not provided is not converted into an electrical signal. As a result, a ratio of the amount of light incident on the light receiving element (light sensing zone) 42 of the light receiving section 4 to the amount of light contained in the scannable beam changes periodically. The periodical electrical signal thus generated is processed by a well-known processing circuit.

FIG. 2 shows a state in which a positional relationship such that the light transmitting portion 13 of the movable slit 1 agrees with the light transmitting portion 33 of the stationary slit 3.

As a technical improvement of such an encoder, there has been proposed a technique in which a condenser lens is formed at a portion overlapping with the light transmitting portion 13, 33 of the movable slit 1 or stationary slit 3 so as to prevent a phenomenon (so-called a light leakage) that a part of the light passing through the light transmitting portion 33 of the stationary slit 3 is dispersed sidewards (see Japanese Patent Laid-Open Publication No. 8-201114). Also, there is also known a structure in which the stationary slit 3 is omitted or provided between the movable slit 1 and the light source 5.

However, in the above-described conventional optical encoder, the beam from the light source is made to shift with periodical light and shade by the light intercepting/transmitting function of the movable slit, and a light detection signal is obtained in accordance with a position of the movable slit (relative to the stationary slit or the light receiving element). Therefore, a utilization efficiency of the light is poor in that at least a half of the light emitted from the light source (the hatched portion in FIG. 2) can not contribute to the signal generation at all.

Specifically, at the time when the light emitted from the light source is converted into a shifting beam, almost a half of the light amount has already been wasted, so that an efficient output signal can not be obtained. In the optical encoder proposed in the aforementioned Japanese Patent Laid-Open Publication No. 8-201114, the light dispersing sideways is collected by a condenser lens element provided so as to correspond to the light transmitting portion. However, the problem of at least a half of the light emitted from the light source being wasted is not solved.

Also, in order to form a light and shade grating with the light transmitting portion and light intercepting portion on the movable slit 1 and the stationary slit 3, a complicated and costly process such as chromium deposition, etching and machining is needed to increase the cost of the whole encoder.

SUMMARY OF THE INVENTION

A first object of the present invention is to provide an optical encoder in which a structure of an optical detecting section of a conventional optical encoder is improved to enhance a utilization efficiency of light and thus an efficient signal output is obtained. A second object of the present invention is to provide an optical encoder which does not need chromium deposition, etching, machining, etc. in forming a light and shade grating and is capable of being manufactured easily by a simple manufacturing method such as injection molding, and advantageous in terms of economy.

The present invention uses a conversion device having a lens element group arranged periodically with a predetermined pitch as means for converting a beam emitted from a light source into a plurality of shifting beams distributed periodically.

The optical encoder of the present invention includes a light source for emitting a beam; a conversion device having a plurality of lens elements arranged periodically with a predetermined pitch, for converting the beam emitted from the light source into a plurality of shifting beams periodically distributed and shifting in accordance with a motion of the object; and a light receiving section having a light sensing zone and a light non-sensing zone which are arranged to be distributed alternately and periodically along a shifting direction of the shifting beams, and disposed stationarily with respect to the shifting beams. Each of the plurality of shifting beams is converged to a width corresponding to the predetermined pitch of the arrangement of the light sensing zone and the light non-sensing zone, at the time of impinging on the light sensing zone and the light non-sensing zone.

The plurality of lens elements are provided on either or both of the light outgoing side and the light incident side of the conversion device. In a preferred embodiment, the conversion device is provided with the plurality of lens elements arranged periodically with the predetermined pitch in a pair on the light incident surface side and the light outgoing surface side. By using this structure, the beam emitted from the light source can be made parallel when going out of the conversion device.

In any mode, the conversion device having the plurality of lens elements may be a plastic-molded product.

The arrangement of the light sensing zone and the light non-sensing zone can be formed by the light receiving elements provided periodically without using a stationary slit, but the stationary slit may be used.

Unlike the conventional arrangement shown in FIG. 2, the optical encoder of the present invention eliminates a situation in which almost a half of the amount of light is wasted at the time of converting the beam emitted from the light source into the shifting beams. Therefore, a signal output with a double efficiency can be obtained in principle as compared with the conventional construction. Also, since a complicated process such as deposition, etching, and punching is not needed to form the light intercepting portion on the device for forming the shifting beams, the optical encoder of the invention is also advantageous in terms of manufacturing cost.

BRIEF DESCRIPTION OF THE DRAWINGS

FIG. 3 is a sectional view showing a structure of a principal part of an optical encoder accordance to a first embodiment of the present invention;

FIG. 5 is a view showing an arrangement of a light receiving section which may be used when the present invention is applied to a signal generating portion of A/B phase and A'/B' phase, which is the reversed phase thereof;

FIG. 6 is a sectional view showing a structure of a principal part of an optical encoder according to a second embodiment of the invention;

FIG. 7 is a sectional view showing a structure of a principal part of an optical encoder according to a third embodiment of the invention;

FIG. 9a is a graph showing an output signal obtained from an output of the light receiving element in the encoder of the invention, and FIG. 9b is a graph showing an output signal obtained from an output of the light receiving element in a conventional encoder.

DESCRIPTION OF THE PREFERRED EMBODIMENTS

Figure 1:
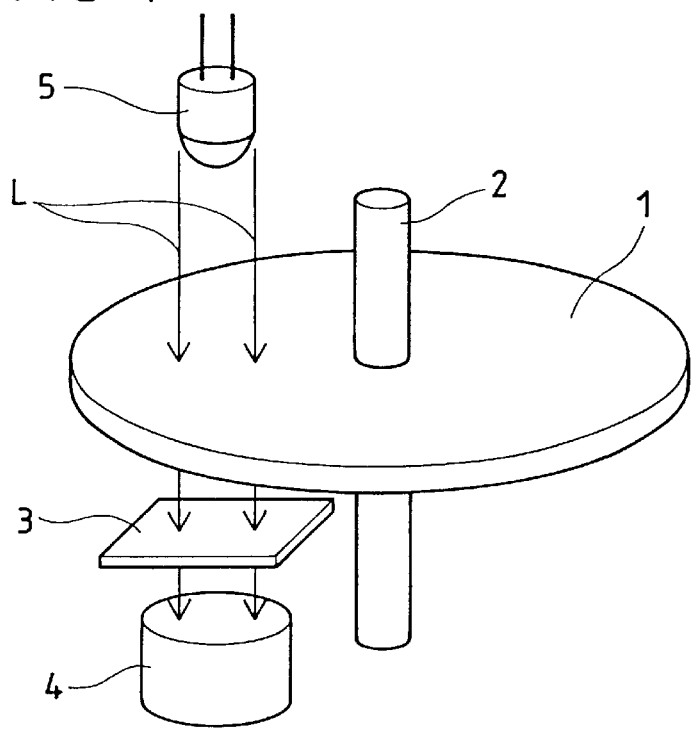
FIG. 1 is a schematic view showing a structure of an optical detecting section of a conventional rotary-type optical encoder.

A structure of a principal part of a first embodiment of the present invention will be described referring to FIGS. 3, 4a, 4b and 5. An optical detecting section of an optical encoder according to this embodiment adopts a conversion device 6 having a plurality of lens elements 61 arranged periodically with a predetermined pitch (reference pitch IP), as means for converting a beam L from a light source 5 into a plurality of shifting beams MF.

The conversion device 6 is an element replacing the movable slit 1 (see FIG. 2) in the prior art and converts the beam L from the light source 5 into a plurality of shifting beams MF distributed periodically, to let them impinge on a light receiving section 4. The conversion device 6 of this type is preferably made of a transparent plastic material such as acrylic resin and polycarbonate. If the plastic material is selected for making the conversion device 6, an injection molding technique can be applied in manufacturing so that shapes of the lens elements 61 are designed freely and the conversion device 6 is manufactured at a low cost.

In this embodiment, each lens element 61 is formed as a convex lens element on the light emitting side of the conversion device 6. The light-condensing power (refracting power) of the convex lens element 61 is designed so that a width of the beam is decreased to a half of the reference pitch IP when the shifting beam MF reaches the light receiving element 42. Between the shifting beams MF is formed a shadow region SD where no light passes through.

Figure 4A:
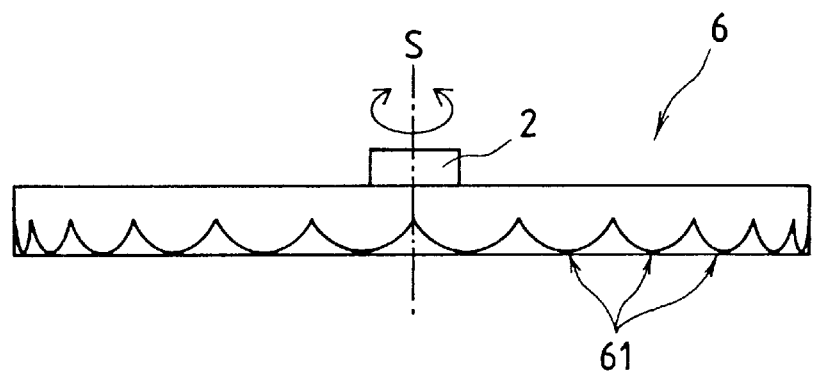
FIG. 4a is a side view showing an outline of a conversion element used when the optical encoder of the first embodiment is applied to a rotary encoder.
Figure 4B:
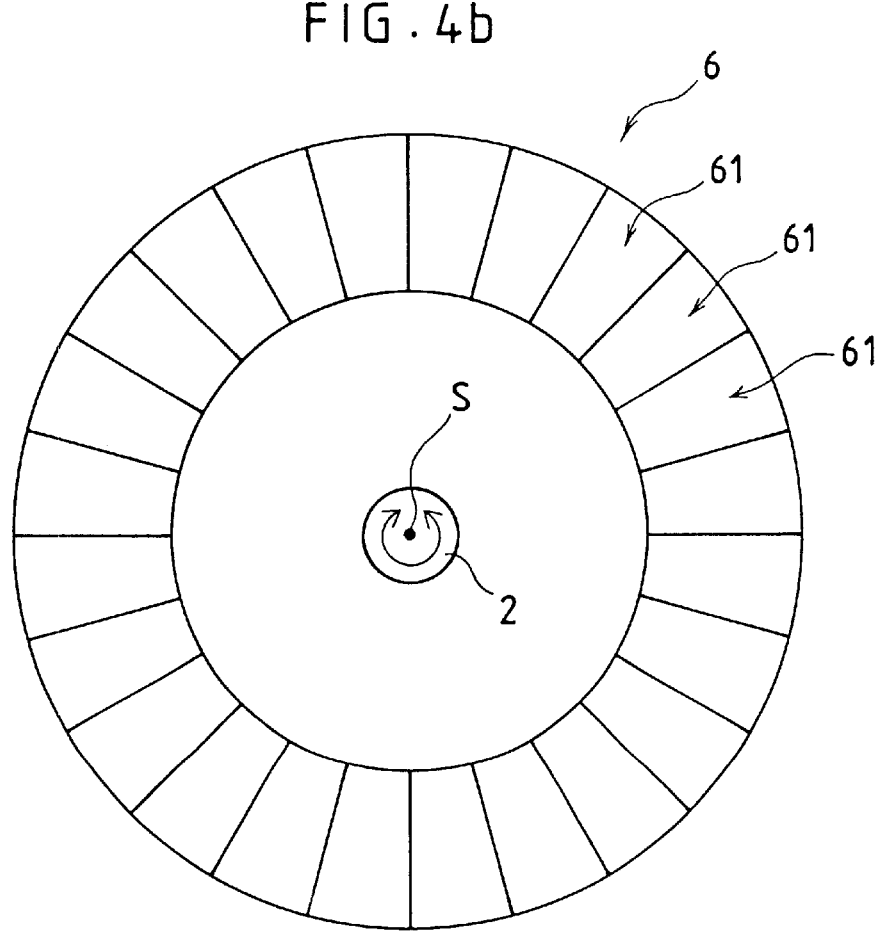
FIG. 4b is a front view thereof.

When the conversion device 6 is designed for a linear encoder, the lens elements 61 are arranged linearly, and when it is designed for a rotary encoder, the lens elements 61 are arranged circularly. FIG. 4a is a side view showing an outline of a conversion device 6 for a rotary encoder, and FIG. 4b is a front view thereof. As shown in FIGS. 4a and 4b, a large number of lens elements 61 are arranged circularly on the conversion device 6. By rotating a rotating shaft member 2 connected to a rotor shaft of a motor or the like, the lens elements 61 is rotated around a center axis S.

The basic structure of the light receiving section 4 may be the same as that of the conventional encoder. In this embodiment, light receiving elements (e.g., photodiodes) 42 are arranged on a board 41 with a pitch of a half of the reference pitch IP. A region in which the light receiving element 42 exist corresponds to the light sensing zone, and a region in which the light receiving element 42 do not exist corresponds to the light non-sensing zone.

When the rotating shaft 2 of the conversion device 6, which is connected to a rotor of a motor or the like, is rotated, the conversion device 6 is rotated, so that a rotational position of each lens element 61 changes synchronously by the same quantity in the same direction. In response thereto, the shifting beam MF shifts to scan a surface of the board on which the light receiving elements 42 are arranged.

As a result, a ratio of an amount of the light received by the light receiving element 42 to an amount of the light in the shifting beam MF changes periodically. The amount of the light detected by each light receiving element 42 is converted into an electrical signal which changes periodically, and processed by a well-known processing circuit. FIG. 3 shows a state in which a positional relationship between the conversion device 6 and the light receiving element 42 is such that the amount of the light of the shifting beams MF incident on the light receiving element 42 is at a maximum (almost the whole quantity).

A planar arrangement of the light receiving elements 42 is designed in accordance with a phase of a signal to be obtained. FIG. 5 is a view illustrating the arrangement of the light receiving section 4 adopted in applying the present invention to a signal generating portion of A/B phases and the reversed phases (A'/B' phases). In this example, light receiving element groups 42a (for phase A), 42b (for phase B), 42a' (for phase A') and 42b' (for phase B') are respectively arranged in four regions of the light receiving section 4, as indicated by reference symbols 41a, 41b, 41a' and 41b' in FIG. 5, each group being shifted by a quarter of the reference pitch IP and each light receiving element being shifted by a half of the reference pitch in each group.

Figure 2:
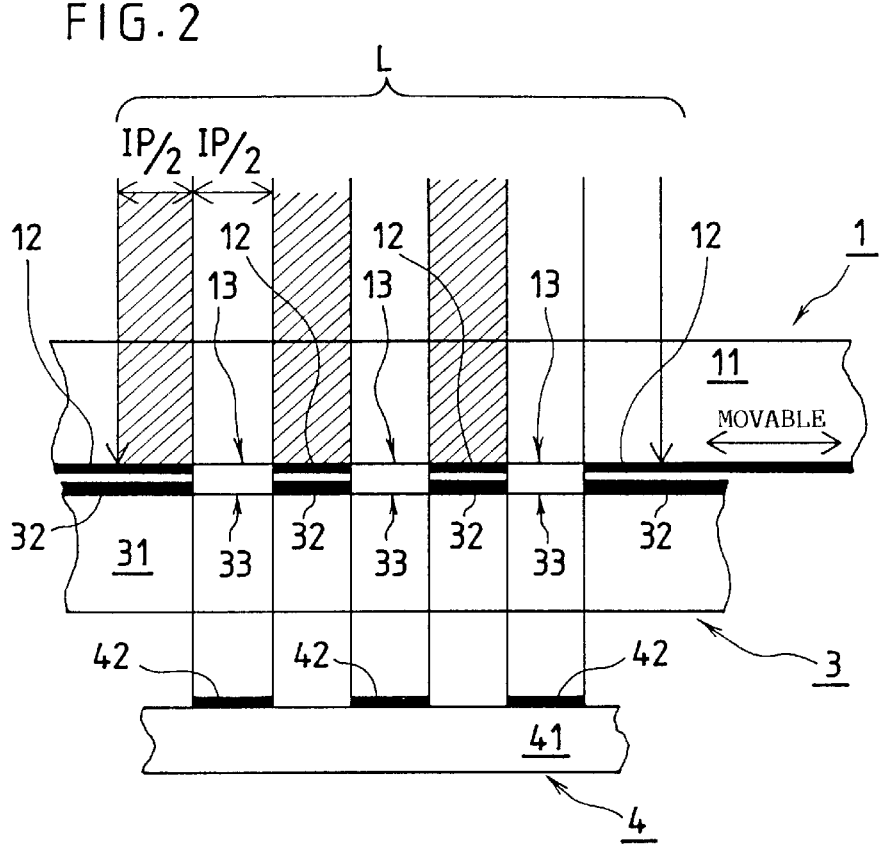
FIG. 2 is a sectional view showing a structure of a movable slit, a stationary slit and a light receiving section used in the conventional optical encoder shown in FIG. 1.

As seen from a comparison between FIG. 2 and FIG. 3, it is important that approximately half of the light amount is wasted in converting the beam from the light source into the shifting beams in the conventional structure shown in FIG. 2, while any waste of the light amount by an interception of the light is not caused in converting the beam into the shifting beams in the structure of this embodiment shown in FIG. 3.

Therefore, an output signal is obtained with a double efficiency in principle, as compared with the conventional structure. FIGS. 9a and 9b graphically show this comparison. An output signal having a cycle corresponding to the reference pitch IP is obtained in both cases of this embodiment shown in FIG. 9a and the conventional structure shown in FIG. 9b, and an amplitude of the output signal of this embodiment is almost twice as large as that of the conventional structure. This means that an SN ratio twice as large as that of the conventional structure is obtained if an illumination power of the light source 5 and other conditions are fixed.

The shape and arrangement of the lens elements (the conversion devices 61 in the first embodiment) provided in the conversion device (the conversion device 6 in the first embodiment) for converting the beam into the shifting beams may be modified in various ways.

Figure 8:
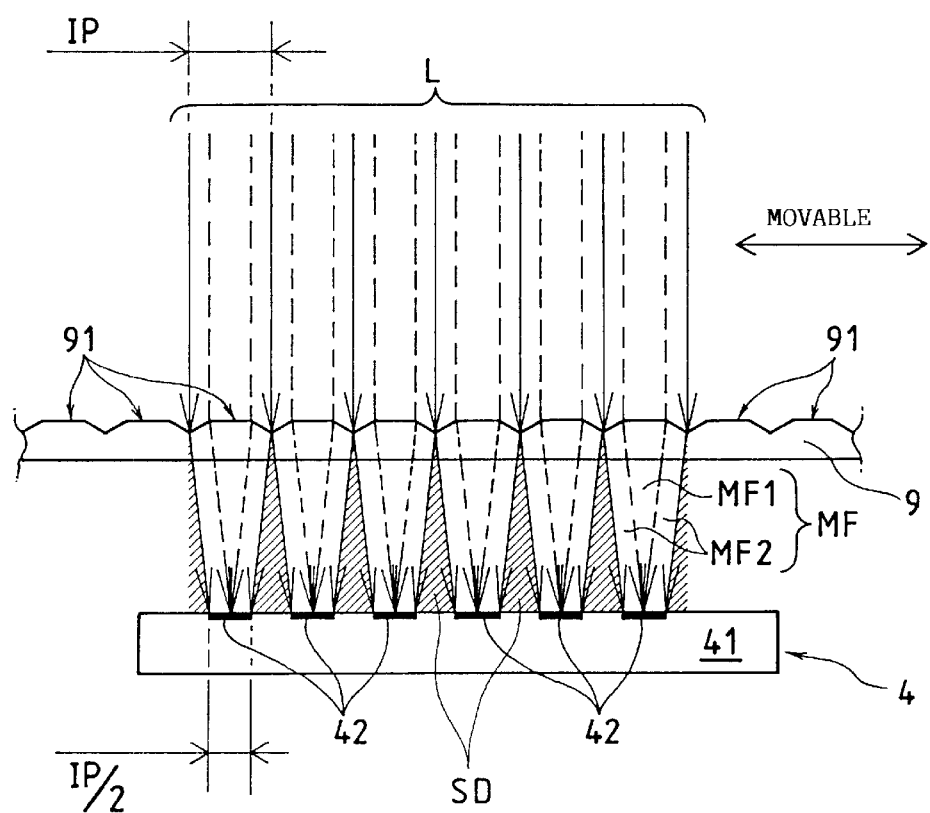
FIG. 8 is a sectional view showing a structure of a principal part of an optical encoder according to a fourth embodiment of the invention.

FIGS. 6, 7 and 8 are illustrations of second to fourth embodiments in the same manner as in FIG. 3, for showing modifications of the lens element provided in the conversion device. First, referring to FIG. 6 showing the second embodiment, an optical detecting section of an optical encoder uses a conversion device 7 having a plurality of lens elements 71 and 72 arranged periodically with the reference pitch IP as means for converting a beam L from a light source 5 into a plurality of shifting beams MF.

In this embodiment, each lens element 71 provided on the incident side of the conversion device 7 and each lens element 72 provided on the outgoing side are paired with each other. Specifically, the beam L of a width of IP (reference pitch) incident on each lens element 71 is contracted to approximately IP/2 within the conversion device 7 and goes out from the corresponding lens element 72 as a parallel beam having a width of IP/2 , to impinge a light receiving section 4. The portions SD indicated by hatches are shadow portions where on shifting beam passes through.

One feature of this embodiment is that since the shifting beam MF is obtained as a parallel beam, there is no restriction on a distance d between the conversion device 7 (equivalent to the conventional movable slit) and the light receiving section 4. Thereby, the conversion device 7 and the light receiving section 4 are not necessary to be disposed closer to each other and allowed to be apart from each other. As a result, the flexibility of design is enhanced, and the assembly is made easy. Also, this embodiment has an advantage that even if a planar deflection in rotation of the conversion device 7 occurs, the detected signal is scarcely affected because the shifting beam MF is obtained as a parallel beam.

The material, manufacturing and the like of the conversion device 7 are the same as those of the aforementioned conversion device 6, so that the repeated explanation thereof is omitted. Also, when the conversion device 7 is applied to a linear encoder, the lens elements 71 and 72 are arranged linearly, and when it is applied to a rotary encoder, they are arranged annularly.

The basic structure of the light receiving section 4 used in combination may be the same as that of the first embodiment. In this embodiment, adopted is the light receiving section 4 on which a repetitive arrangement of a light sensing zone and a light non-sensing zone is formed by providing light receiving elements (e.g., photodiodes) 42 on a board 41 with a pitch of a half of the reference pitch.

When an object (not shown) connected to the conversion device 7 moves (rotation or translation), the conversion device 7 is moved and the positions of the lens elements 71 and 72 are changed synchronously in the same direction by the same amount. Accordingly, the shifting beam MF shifts to scan a surface on which the light receiving elements 42 are arranged. As a result, a ratio of an amount of the light received by the light receiving element 42 to an amount of the light in the shifting beam MF changes periodically. The amount of the light detected by each light receiving element 42 is converted into an electrical signal which changes periodically, and processed by a well-known processing circuit.

FIG. 6 shows a state in which a positional relationship between the conversion device 6 and the light receiving element 42 is such that the amount of the light of the shifting beams MF incident on the light receiving element 42 is at a maximum (almost the whole quantity). The planar arrangement of the light receiving elements (light sensing zones) 42 may be the same as that in the first embodiment. For example, in applying the present invention to a signal generating portion of A/B phase and the reversed phase (written as A'/B' phase), the arrangement of the light receiving section 4 explained referring to FIG. 6 can be adopted.

As seen from a comparison between FIG. 2 and FIG. 6, any waste of the light amount by an interception of the light is not caused in converting the beam into the shifting beams also in this embodiment. Therefore, an output signal is obtained with a double efficiency in principle, as compared with the conventional structure, corresponding to the aforementioned graph shown in FIG. 9a (with an amplitude substantially twice as large as that in the conventional structure). Thus, an SN ratio twice as large as that of the conventional structure is obtained if an illumination power of the light source 5 and other conditions are fixed.

FIG. 7 shows the third embodiment. Referring to FIG. 7, an optical detecting section of an optical encoder uses a conversion device 8 having a plurality of lens elements 81 arranged periodically with the reference pitch IP as means for converting a beam L from a light source into a plurality of shifting beams MF. The conversion device 8 in this embodiment corresponds to a device obtained by turning over the conversion device 6 in the first embodiment shown in FIG. 3. All lens elements 81 are provided on the incident side.

A beam L of a width of IP (reference pitch) incident on each lens element 81 is converted into a convergent shifting beam MF, and impinges on a light receiving section 4 in a state of being contracted to a width of IP/2 (half the reference pitch). The portions SD indicated by hatches are shadow portions where no shifting beam passes through. The material, manufacturing and the like of the conversion device 8 are the same as those of the aforementioned conversion devices 6 and 7. Also, like the conversion devices 6 and 7, when the conversion device 8 is applied to a linear encoder, the lens elements 81 are arranged linearly, and when it is applied to a rotary encoder, they are arranged annularly. The basic structure of the light receiving section 4 used in combination may also be the same as that of the first embodiment.

Also, the principle of signal generation when an object connected to the conversion device 8 moves is the same as that in the first and second embodiments, so that repeated explanation thereof is omitted. FIG. 7 also shows a state in which a positional relationship between the conversion device 7 and the light receiving element 42 is such that the amount of the light of the shifting beams MF incident on the light receiving element 42 is at a maximum (almost the whole quantity). The planar arrangement of the light receiving elements (light sensing zones) 42 may be the same as that in the first and second embodiments. For example, if the present invention is applied to a signal generating portion of A/B phase and the reversed phase (written as A'/B' phase), the arrangement of the light receiving section 4 explained referring to FIG. 6 can be adopted.

As seen from a comparison between FIG. 2 and FIG. 7, any waste of the light amount by an interception of the light is not caused in converting the beam into the shifting beams also in this embodiment. Therefore, an output signal is obtained with a double efficiency in principle, as compared with the conventional structure, corresponding to the afore- mentioned graph shown in FIG. 9a (with an amplitude substantially twice as large as that in the conventional structure). Thus, an SN ratio twice as large as that of the conventional structure is obtained if an illumination power of the light source 5 and other conditions are fixed.

Next, referring to FIG. 8 showing the fourth embodiment, still another example of the lens element provided in the conversion device is shown. Specifically, the conversion device 9 used in this embodiment has a plurality of trapezoidal lens elements 91 arranged on the incident side periodically with the reference pitch IP. As shown in the figure, the beam L with a width of IP (reference pitch) incident on each lens element is converted into a shifting beam MF containing a strongly convergent portion MF2 at the periphery thereof (composition of MF1 and MF2: MF1 is a parallel beam with a width of IP/2), and impinges on the light receiving section 4 in a state of being contracted to a width of IP/2 (a half of the reference pitch). A hatched portion SD is a shadow portion where no shifting beam passes through. The material, manufacturing, operation and others of the conversion device 8 are the same as those in the aforementioned embodiments, so that the repeated explanation thereof is omitted.

As seen from a comparison between FIG. 2 and FIG. 8, any waste of the light amount by an interception of the light is not caused in converting the beam into the shifting beams also in this embodiment. Therefore, an output signal is obtained with a double efficiency in principle, as compared with the conventional structure, corresponding to the aforementioned graph shown in FIG. 9a (with an amplitude substantially twice as large as that in the conventional structure). Thus, an SN ratio twice as large as that of the conventional structure is obtained if an illumination power of the light source 5 and other conditions are fixed.

Figure 10:
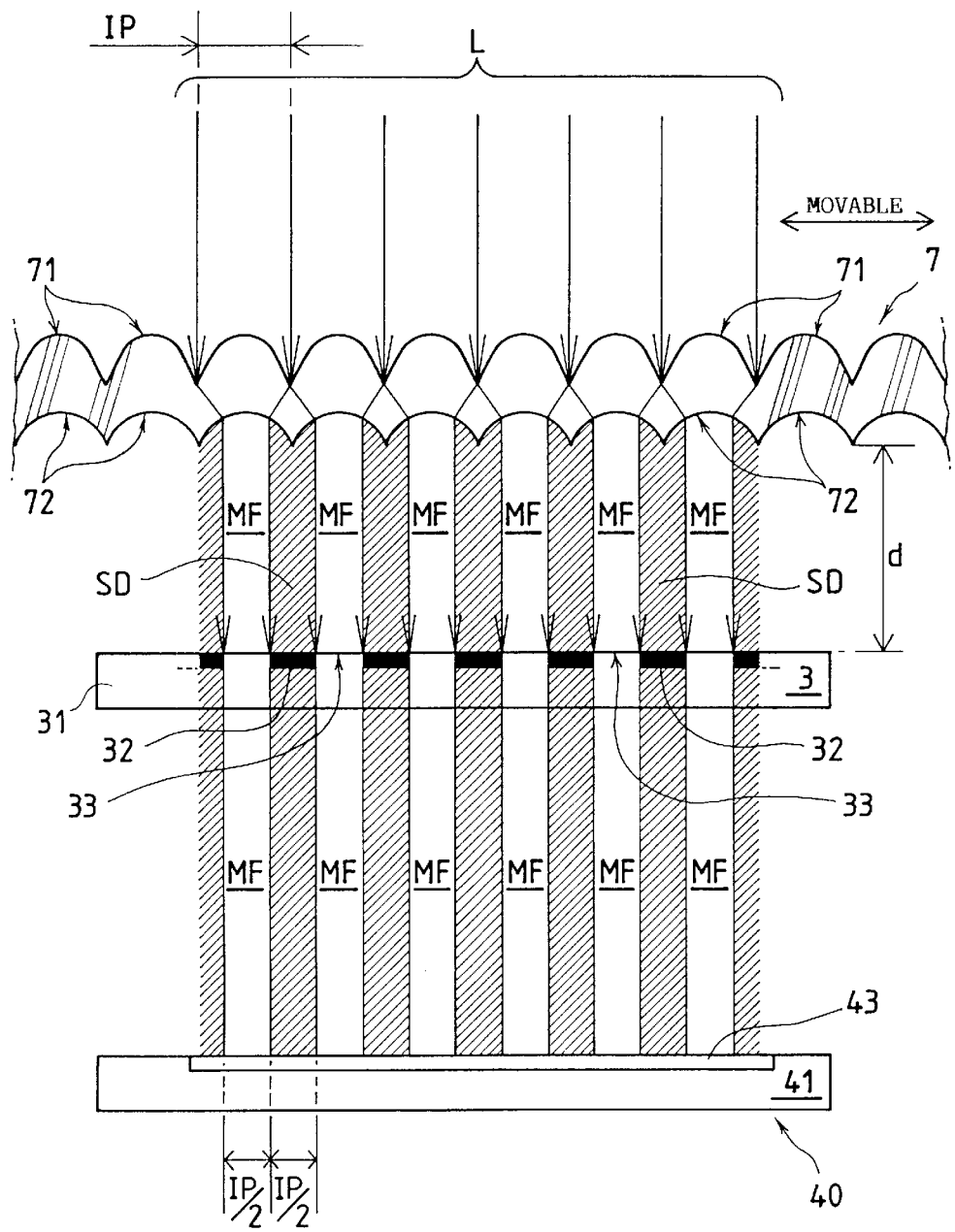
FIG. 10 is a sectional view showing a structure of a principal part of an optical encoder accordance to a fifth embodiment of the invention.

In the above-described embodiment, the repetitive arrangement of the light sensing zone and the light non-sensing zone of the light receiving section is formed by the light receiving elements provided periodically without using a stationary slit. However, like in the case of the prior art, a stationary slit may be used. FIG. 10 shows a fifth embodiment in which a stationary slit is used for forming the repetitive arrangement of the light sensing zone and the light non-sensing zone of the light receiving section.

This embodiment has a structure equivalent to that of the second embodiment shown in FIG. 4, except that a formation of the repetitive arrangement of the light sensing zone and the light non-sensing zone of the light receiving section is changed. Specifically, in this embodiment as well, the optical detecting section uses a conversion device 7 having a plurality of lens elements 71 and 72 arranged periodically with the reference pitch IP as means for converting the beam L from a light source (not shown) into a plurality of shifting beams MF.

The lens element 71 provided on the incident side of the conversion device 7 and the lens element 72 provided on the outgoing side are paired. The beam L of a width IP (reference pitch) incident on the lens element 71 is contracted to approximate IP/2 in the conversion device 7 and goes out of the corresponding lens element 72 as a parallel beam of a width IP/2, to impinge on the stationary slit 3. A hatched portion SD is a shadow portion where no shifting beam passes through.

The stationary slit 3 is the same as that of the prior art. On the surface (one surface or both surfaces) of a transparent board 31, light intercepting portions 32 and light transmitting portions 33 are formed periodically with a pitch of a half of the reference pitch IP, which is the same as that of the movable slit 1. Therefore, a component of the shifting beam MF impinged on the light transmitting portion 33 (almost 100% in the state shown in the figure) goes toward the light receiving section 40, but a component impinged on the light intercepting portion 32 (almost 0% in the shown state) can not go toward the light receiving section 40.

In the case where such stationary slit 3 is provided, a light receiving surface 43 having a spread equivalent to an effective width of the stationary slit 3, which is formed on the board 41, can be used. However, like the conventional encoder, division for separating signals of phase A, phase B and the reversed phases thereof is necessary (see the explanation relating to FIG. 5).

When a rotating shaft connected to a rotor of a motor or the like, the conversion device 7 is rotated and the shifting beams MF are produced. The overlapping relationship between the shifting beam MF and the light transmitting portion 33 changes periodically according to the motion of the shifting beam MF (and therefore the object to be detected).

Then, the component (light amount) of the shifting beam MF that can pass through the stationary slit 3 changes periodically and is detected by the light receiving surface 43. The detected light is converted into an electrical signal and processed by a well-known processing circuit.

This embodiment has an advantage similar to that of the second embodiment. Specifically, since the shifting beams MF are obtained as parallel beams, there is no restriction on a distance between the conversion device 7, which corresponds to the conventional movable slit, and the stationary slit 3, and a distance between the stationary slit 3 and the light receiving section 40, so that the conversion device 7, the stationary slit 3 and the light receiving section 40 need not be disposed close to each other.

Therefore, flexibility of design is enhanced and assembly is made easy. Also, since the shifting beams MF are obtained as parallel beams, even if a planar deflection of the conversion device 7 in rotation occurs, the detected signal is scarcely affected. In this embodiment as well, any waste of the light amount by an interception of the light is not caused in converting the beam into the shifting beams also in this embodiment. Therefore, an output signal is obtained with a double efficiency in principle, as compared with the conventional structure, corresponding to the aforementioned graph shown in FIG. 9a (with an amplitude substantially twice as large as that in the conventional structure). Thus, an SN ratio twice as large as that of the conventional structure is obtained if an illumination power of the light source 5 and other conditions are fixed.

In the optical encoder according to the present invention, utilization efficiency of light is high and an efficient output signal can be obtained. Also, since a conversion device which is easy to manufacture is used as means for converting the beam into the shifting beams, the manufacturing cost of the optical encoder can be reduced.

What is claimed is:

1. An optical encoder for detecting position and/or speed of a movable object, comprising:

a light source to emit a beam;

a conversion device to be operatively connected to the movable object and having a plurality of lens elements arranged periodically with a predetermined pitch, to convert the beam emitted from said light source into a plurality of shifting beams periodically distributed and shifting in accordance with a motion of said movable object, said plurality of lens elements being provided on a light incident surface side and a light outgoing surface side in a pair; and a light receiving section having plurality of a light sensing zones and a plurality of light non-sensing zones which are arranged to be distributed alternately and periodically along a shifting direction of said shifting beams, and disposed stationarily with respect to said shifting beams, wherein said plurality of shifting beams are converged into a plurality of parallel beams, by the plurality of lens elements, such that each of said plurality of shifting beams is converged to a width of one of said light sensing zones, at the time of going out of said conversion device.

2. An optical encoder according to claim 1, wherein said plurality of light sensing zones are formed by a plurality of light receiving elements.

3. An optical encoder according to claim 1, wherein said plurality of light sensing zones and said plurality of light non-sensing zones are formed by a stationary slit member having light transmitting portions to form said plurality of light sensing zones and light intercepting portions to form said plurality of light non-sensing zones, and a light receiving element to receive light passing through said light transmitting portions of said stationary slit member.

4. An optical encoder according to claim 1, wherein said conversion device having said plurality of lens elements comprises a plastic-molded product.

5. An optical encoder for detecting position and/or speed of a movable object, comprising:

a light source to emit a beam of light; and a conversion device operatively connected to the movable object and having pairs of lens elements arranged periodically with a predetermined pitch on a light incident surface side and a light outgoing surface side of the conversion device, respectively, to convert the beam emitted from said light source into periodically distributed parallel shifting beams, wherein each of said shifting beams results from a focusing, in a narrowing manner, to a width for detection by one of a plurality of light sensing zones of a light receiving section.

6. An optical encoder, comprising:

a light source to emit a beam of light having a plurality of contiguous beam portions incident on a conversion device;

the conversion device having lens elements arranged periodically with a predetermined pitch of the conversion device, to convert the incident beam portions into corresponding periodically distributed parallel shifting beams; and a light receiving section to detect the shifting beams, wherein a focusing of a beam portion by a lens element includes a narrowing of the beam portion to a width for detection by a light sensing zone on the light receiving section.

7. the optical encoder of claim 6, wherein there is no light loss during the narrowing of the beam portion.

* * * * *

UNITED STATES PATENT AND TRADEMARK OFFICE
CERTIFICATE OF CORRECTION

PATENT NO. : 6,703,601 B2
DATED : March 9, 2004
INVENTOR(S) : Mitsuyuki Taniguchi et al.

It is certified that error appears in the above-identified patent and that said Letters Patent is hereby corrected as shown below:

<u>Column 1,</u>
Line 55, change "is" (second occurrence) to -- are --;
Line 56, change "is" to -- are --.

<u>Column 2,</u>
Line 13, change "are" to -- is --;
Line 39, delete "also" (second occurrence)
Lines 50 and 55, change "can not" to -- cannot --.

<u>Column 3,</u>
Line 35, change "are" to -- is --.

<u>Column 4,</u>
Lines 5 and 31, change "accordance" to -- according to --.

<u>Column 5,</u>
Line 6, change "is" to -- are --;
Lines 12 and 13, change "element" to -- elements --.

<u>Column 6,</u>
Line 24, change "on" to -- no --.

<u>Column 9,</u>
Lines 6-7, change "can not" to -- cannot --;
Lines 43-44, delete "also in this emodiment".

<u>Column 10,</u>
Line 7, after "having" insert -- a -- and change "of a" to -- of --;
Lines 12 and 19, change "are" to -- is --;

UNITED STATES PATENT AND TRADEMARK OFFICE
CERTIFICATE OF CORRECTION

PATENT NO. : 6,703,601 B2
DATED : March 9, 2004
INVENTOR(S) : Mitsuyuki Taniguchi et al.

It is certified that error appears in the above-identified patent and that said Letters Patent is hereby corrected as shown below:

<u>Column 10 cont'd,</u>
Line 62, change "the" to -- The --.

Signed and Sealed this

Twenty-second Day of June, 2004

JON W. DUDAS
*Acting Director of the United States Patent and Trademark Office*